Aug. 7, 1934.   G. GAIDIES ET AL   1,968,823
GASEOUS ELECTRIC DISCHARGE LAMP DEVICE
Filed Aug. 21, 1933
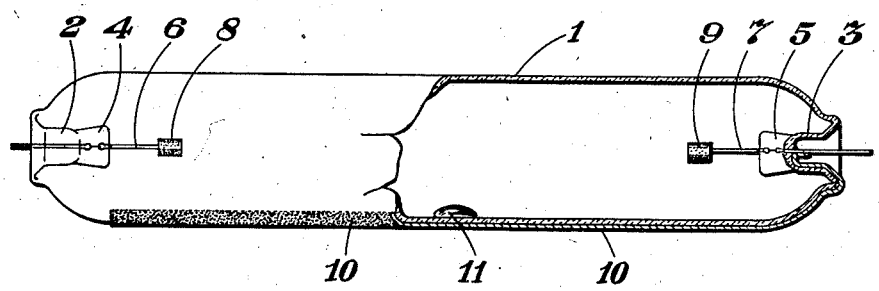
INVENTORS
Georg Gaidies
Emerich Tarjan
Max Thomas
BY Harry E. Dunham
ATTORNEY Patented Aug. 7, 1934

1,968,823

UNITED STATES PATENT OFFICE 1,968,823

GASEOUS ELECTRIC DISCHARGE LAMP DEVICE

Georg Gaidies, Berlin-Pankow, Emerich Tarján, Berlin - Neu - Tempelhof, and Max Thomas, Weisswasser (Oberlausitz), Germany, assignors to General Electric Company, a corporation of New York Application August 21, 1933, Serial No. 686,166 In Germany September 23, 1932

5 Claims. (Cl. 176—122)

The present invention relates to gaseous electric discharge lamp devices generally and more particularly the invention relates to glass compositions useful in connection with such devices having a filling of mercury vapor therein.

The glass containers of mercury vapor lamps frequently become brownish in color during the operation of the lamp which deleteriously effects the light transmission characteristics of the container to lower the efficiency of the lamp. This is undoubtedly due to the action of the mercury vapor, the ultra-violet radiations and the ionized vapor. This brownish tinge of the container is particularly noticeable in mercury vapor lamps having electrodes which are electron emitting when heated and a starting gas such as argon or neon and which are operated at high temperatures and high current densities.

The object of the present invention is to provide a glass for the container of a gaseous electric discharge lamp device having a mercury vapor filling or a gaseous filling comprising mercury vapor which glass does not become brown in color during the operation of the lamp device. Still further objects and advantages attaching to the device and to its use and operation will be apparent to those skilled in the art from the following particular description.

We have discovered that an alkali lime silicate glass containing less than 10% sodium oxide and more than 10% potassium oxide does not become brown when used as the container of a gaseous electric discharge lamp device containing mercury vapor. The glass also contains approximately 0.5 to 5% of alumina and a small amount of boric acid though this latter constituent can be omitted when desired.

Containers made of glasses having the following compositions do not assume a brownish tinge during the operation of a mercury vapor lamp:—

|  | I | II |
|---|---|---|
|  | Percent | Percent |
| $SiO_2$ | 72.8 | 73.0 |
| $B_2O_3$ |  | 2.0 |
| $Al_2O_3$ | 3.6 | 1.8 |
| $K_2O$ | 11.3 | 13.0 |
| $Na_2O$ | 5.0 | 2.0 |
| $CaO$ | 7.3 | 6.2 |
| $ZnO$ |  | 2.0 |

It will be understood of course that where the mercury vapor lamp is to be used as an ultra violet generator the glass of the lamp container should contain no oxides which would cut down the ultra violet transmission characteristics of the container. Such oxides are, for example, iron oxide, titanium oxide, manganese oxide, or antimony oxide.

In the drawing accompanying and forming part of this specification a gaseous electric discharge lamp device having a container made of the new and novel glass of the present invention is shown in a side elevational partly sectional view.

Referring to the drawing the lamp device comprises a tubular container 1 having stems 2 and 3 at each end thereof. Electrodes 8 and 9 are mounted on leads 6 and 7 respectively and said leads 6 and 7 are sealed into the pinch 4 and 5 of the stems 2 and 3 respectively. Said electrodes 4 and 5 are electron emitting when heated and are, for example, pellets comprising a sintered mixture of finely divided metal, such as tungsten and electron emitting material, such as barium oxide. A coating 10 of electrically conducting material, such as graphite, is applied to the outer wall of said container 1 and extends along the discharge path between said electrodes 8 and 9. Said coating 10 is electrically connected to the electrode lead 7 as shown. Said container 1 has a rare gas therein at a pressure of a few millimeters, such as argon or neon, and a body 11 of vaporizable material, such as mercury. The gaseous electric discharge starts in said rare gas and the heat therefrom vaporizes the body 11 so that a mixture of rare gas and mercury vapor is present in the container 1 during the operation of the lamp device.

The container 1 consists of a glass made in accordance with one of the formulas given heretofore and said container 1 does not become brown in color during the operating life of the gaseous electric discharge lamp device even though said container 1 is at a high temperature during the operation of the device.

It will be understood, of course, that by virtue of the electron emitting electrodes 8 and 9 high current densities can be used in the lamp and the lamp can be enclosed in a heat conserving envelope all of which maintains the container 1 at an elevated temperature to keep the vapor therein at a high pressure to increase the intensity of the light emitted by the gaseous electric discharge lamp device.

While we have shown and described a particular form of lamp device in which our invention is useful, it will be understood that the invention is useful in mercury vapor lamps generally.

What we claim as new and desire to secure by Letters Patent of the United States is:—

1. An electric discharge lamp device comprising a container, electrodes sealed therein, a gaseous atmosphere therein comprising mercury vapor, said container being of an alkali-lime silicate glass comprising less than 10% sodium oxide and more than 10% potassium oxide.

2. An electric discharge lamp device comprising a container, electrodes sealed therein, a gaseous atmosphere therein comprising mercury vapor, said container being of an alkali-lime silicate glass comprising less than 10% sodium oxide, more than 10% potassium oxide and 0.5 to 5% of alumina.

3. An electric discharge lamp device comprising a container, electrodes sealed therein, a gaseous atmosphere therein comprising mercury vapor, said container being of an alkali-lime silicate glass comprising less than 10% sodium oxide, more than 10% potassium oxide, 0.5 to 5% of alumina and a small amount of boric acid.

4. An electric discharge lamp device comprising a glass container, electrodes sealed therein, a gaseous atmosphere therein comprising mercury vapor, said container being of a glass having the following composition:

| | Per cent |
|---|---|
| $SiO_2$ | 72.8 |
| $B_2O_3$ | |
| $Al_2O_3$ | 3.6 |
| $K_2O$ | 11.3 |
| $Na_2O$ | 5.0 |
| $CaO$ | 7.3 |
| $ZnO$ | |

5. An electric discharge lamp device comprising a glass container, electrodes sealed therein, a gaseous atmosphere therein comprising mercury vapor, said container being of a glass having the following composition:

| | Per cent |
|---|---|
| $SiO_2$ | 73.0 |
| $B_2O_3$ | 2.0 |
| $Al_2O_3$ | 1.8 |
| $K_2O$ | 13.0 |
| $Na_2O$ | 2.0 |
| $CaO$ | 6.2 |
| $ZnO$ | 2.0 |

GEORG GAIDIES.
EMERICH TARJÁN.
MAX THOMAS.